March 18, 1969　　　　H. A. LEHMANN　　　　3,433,240
HYDRAULIC PRESSURE RELIEF VALVE UNIT
Filed April 18, 1967　　　　　　　　　　　　Sheet 1 of 2

INVENTOR
HAROLD A. LEHMANN.
BY
Geo J Muckenthaler ATT'Y
R. D. Goddard AG'T

United States Patent Office 3,433,240
Patented Mar. 18, 1969

3,433,240
HYDRAULIC PRESSURE RELIEF VALVE UNIT
Harold Adolf Lehmann, Racine, Wis., assignor to
J. I. Case Company, Racine, Wis., a corporation
of Wisconsin
Filed Apr. 18, 1967, Ser. No. 631,822
U.S. Cl. 137—108                        5 Claims
Int. Cl. G05d 7/01

ABSTRACT OF THE DISCLOSURE

A relief device for a hydraulic system arranged to relieve excess pressure caused by continuous pumping of the hydraulic fluid after reaching the extreme position in the cycle of the hydraulic motor. A pilot operated differential effect is attained by the varying pressure surfaces in the relief device in that the pilot part initially opens at a high pressure and relieves at a lower pressure.

Background of the invention

The invention pertains to and is useful in a hydraulic steering system to relieve the fluid pressures in a full turn position of a vehicle. The device presents at least two surfaces to the fluid flow, one for initially relieving the high fluid pressure on opening and another for further relieving and allowing fluid flow at a lower pressure.

In previous hydraulic systems, a relief valve was sometimes used to serve as a secondary control valve to relieve the high pressure and to return the excess fluid flow to the reservoir or to the pumping unit. The relief valve discharge to the pumping elements was extremely fast and usually constituted a complete "make or break" flow of fluid. Consequently, very little cooling fluid was introduced to the pumping elements which resulted in extremely high temperatures. Surface tension or film strength of the fluid broke down, resulting in metal to metal contact and early pump seizure and failure. Fluid systems have generally included a simple spring-loaded ball type relief valve sometimes referred to as poppet type relief valves.

This type of valve, when subjected to prolonged high pressure conditions, will oscillate or bounce due to the fact that the instant the valve unseats or lifts to release the excess pressure, there is a sudden pressure drop under the ball or valve. This sudden pressure drop, plus the reacting spring pressure, causes the valve to reseat again wherein the pressure again builds up which again unseats the valve and causes another reaction cycle. This type of oscillating action, due to the sudden high and low pressures on the relief valve, will shorten the life of the valve because of peening of the valve surface or marring the ball. This type of valve can be made to hold without leakage initially; however, as the seat starts to peen or the ball becomes marred, the valve will relieve at lower pressures, resulting in inadequate pressure for the work to be done. Of course, this type of action is also extremely detrimental to the associated mechanism in the fluid system.

Summary of the invention

The relief device defines a valve positioned in a hydraulic control system between a source of pressurized fluid and a control valve. The valve includes a primary spool slidable in a body and a secondary spool slidable in the primary spool. The secondary spool includes a first pressure receiving surface and a second pressure receiving surface larger in area than the first surface. The pressurized fluid contacts the smaller area and as the pressure builds up, the secondary spool is moved against a spring, the valve is unseated or initially opened and the fluid flow through the valve thus relieving the high pressures. The fluid next contacts the second pressure surface which is larger in area than the first surface, however, the fluid is at a lower pressure because the open valve has allowed some fluid to flow. The lower pressure acts on the larger surface and holds the valve in a position such that the valve does not immediately close. Instead of the quick opening and closing action, as in prior relief valves, the present valve operates as a balancing device in smoothing out the extreme pressure points in the fluid flow. A restricting device is also inserted in the input line to the relief valve to cancel back pressure shock waves and also to minimize or eliminate the possibility of such shock waves from triggering the relief valve.

It is therefore the main object of the present invention to provide a relief device in a hydraulic system which smooths the fluid flow during the relieving cycle.

Another object is to provide a relief valve which initially opens at a high pressure and relieves at a lower pressure.

A further object is to provide a relief valve which has a longer relief cycle to admit fluid for cooling system components.

An additional object is to provide a relief valve which reduces the reaction forces during the relieving cycle.

Another object is to provide a relief valve wherein pumping of the fluid occurs at a lower pressure and extends the critical temperature time in the pump.

A further object is to provide a restricting device in the relief valve input line to cancel shock waves during the relieving action.

Additional objects and advantages will become apparent from a reading of the specification and the annexed drawings, in which.

Figure 1:
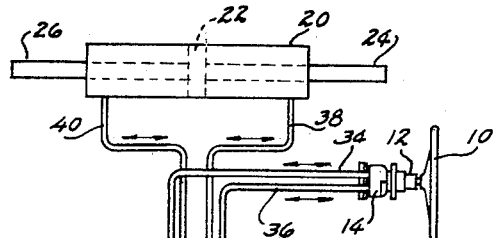
FIGURE 1 is a diagrammatic view of a hydraulic steering system showing the relief device.

A power steering system, as seen in FIG. 1, usually includes an operator steering wheel 10, a steering shaft 12, a hand operated manual pump 14, and steering rods and linkages. These rods, linkages and parts which mechanically connect the steering column with the steerable ground wheels of a vehicle are not shown in the drawings because they can be of conventional type and need not be described as they form no part of the present invention.

An engine driven pump 16 is connected with a reservoir 18 containing hydraulic fluid and which pump provides a source of pressurized fluid for the steering system. The system also includes at least one hydraulic cylinder or motor 20. In this particular instance, the cylinder may be a balanced unit with a piston 22 reciprocating within the cylinder. Some systems use two cylinders, one for connecting to the steering linkage of the right hand wheel and the other to the linkage of the left hand wheel. When hydraulic fluid is directed to one cylinder to extend it, fluid is also directed to the other cylinder to retract it at the same time. In this way, the two cylinders act simultaneously. Of course, with the balanced cylinder as shown, fluid is directed to one end of the cylinder which moves the piston toward the other end and at another time, fluid may be directed to the mentioned other end of the cylinder to move the piston toward the first mentioned end. Rods 24 and 26 are connected to the respective linkages or steering arms depending upon the design of the mechanical portion of the system.

A control valve 28 is inserted in the system to direct the flow of fluid to the desired end of the hydraulic cylinder. A supply line 30 is connected to the pump 16 and to the valve 28 and a return line 32 also connects these elements. A pair of hydraulic lines 34 and 36 are connected to the manual pump 14 and the control valve 28, and a pair of lines 38 and 40 connect the cylinder 20 and the valve 28.

A brief description of the operation at this point with the structure shown is helpful to understand the system. Pump 16 is being driven whenever the vehicle engine is running and hydraulic fluid is being pumped from the reservoir 18 through line 30 to valve 28. With steering wheel 10 in a neutral position, or not being operated, the flow of fluid is circulating from the pump to the control valve through line 30 and back to the reservoir through line 32. When the steering wheel 10 is turned, the manual pump 14 is operated and hydraulic fluid under pressure is directed in a certain direction through line 34 or line 36, depending upon which direction of steering is selected. The fluid flow through one of the lines connecting pump 14 and valve 28 then moves the control valve spool in a certain direction and the fluid then goes through one of the lines 38 or 40 to move the piston 22 in cylinder 20. The direction and amount of fluid flow in lines 34 and 36, of course, depends upon the direction and amount of turn of turning wheel 10.

As stated above, there are known types of relief devices in hydraulic systems which may cover a range from a single safety device to a complicated relief system. A common type is the spring-loaded ball type or poppet type relief valve.

The present invention provides a pilot operated differential relief device in the hydraulic system for the power steering of a vehicle. The relief device or valve 42 is placed in the system and a fluid line 44 connects the pump 16 to the valve 42. A return line 46 is connected to the valve 42 and to the reservoir 18 and a line 48 connects the valve 42 to the supply line 30.

Figure 2:
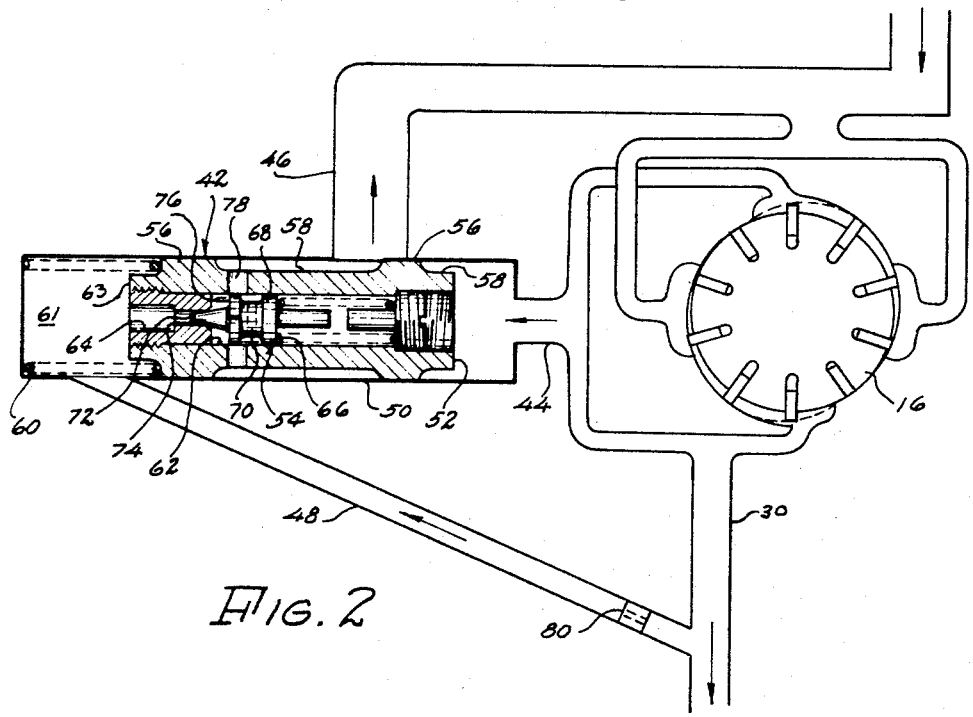
FIG. 2 is a view of the hydraulic pump and the relief valve shown in the closed position.

As seen in FIG. 2, pump 16 is shown in more detail, however, other pumps of similar design may be used in carrying out the invention. Valve 42 is shown as having a body 50 of cylindrical shape, a main spool element 52 slidable within the valve body, and a secondary or pilot spool element 54 slidable within element 52. Spool 52 includes land portions 56, groove portions 58, and a spring 60 which tends to urge the spool 52 toward the right in FIG. 2. When pump 16 is running, fluid is being forced in the direction of the arrows in lines 30, 44, and 48. Thus it is seen that the pressurized fluid in line 44 tends to move spool 52 to the left against the action of spring 60. This same pressure is being applied in line 30 to the control valve 28, and also pressurized fluid is introduced into line 48 to one end 61 of valve body 50. Spool 52 includes a bore 62 for spool 54. A passageway 64 connects one end 63 of spool 52 in end 61 of valve body 50 and bore 62. Spool 54 also has a spring 66 tending to urge the spool toward passageway 64, and spool 54 also includes lands 68 and grooves 70. Valve spool 54 has a nose portion 72 positioned to engage with a reduced portion 74 of passageway 64 and also has a larger annular flat surfaced portion 76.

Spool 52 has a porting groove 78 cooperative with the surface 76 for purposes to be described. When no fluid is being pumped, the position of the valve spools is as shown in FIG. 2, spring 60 urging spool 52 to the right in body 50 and spring 66 urging spool 54 to the left in bore 62. In this position, nose portion 72 seats in reduced portion 74 of passageway 64.

The relief valve 42 as presently constructed is provided to afford adequate relief action when the steerable ground wheels are in a cramped position. With the advent of larger vehicles, the operator is unaware of relief valve action and also steering systems with small reaction forces are highly susceptible in the cramped or full turn condition. Thus it is entirely possible that the operator is increasing his tendency to hold the steering wheel in the cramped position.

Figure 3:
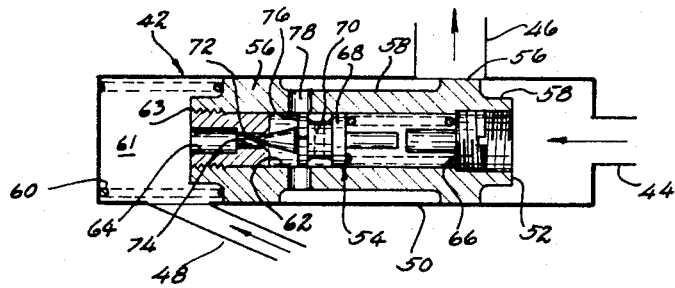
FIG. 3 is a view of the relief valve shown in an initially open position.
Figure 4:
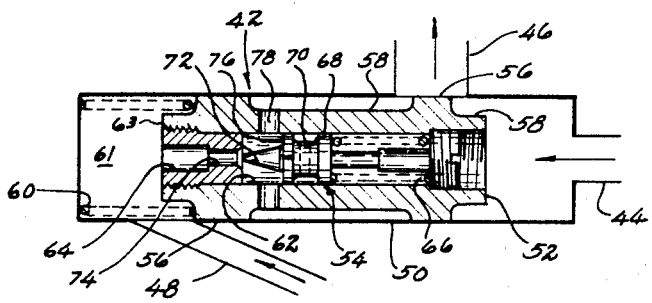
FIG. 4 is a view of the relief valve shown in the full open or relieving position.

When the operator turns the steering wheel 10, pump 16 provides the pressurized fluid through lines 30 to the control valve 28, and through lines 44 and 48 to the relief valve. As the steering wheel is turned, fluid pressure builds up to aid in the steering action. When the steering wheel is in a full turn or cramped position, pump 16 continues to supply fluid and, of course, the pressure increases until the action is relieved by the relief device. When a high pressure is built up in lines 30 and 48, the pressure in the spring end 61 of valve body 50 will exert a force on end 63 of spool 52 and in passageway 64. The force is also exerted on nose portion 72 in the reduced portion 74. The increased fluid pressure acts on the nose portion and at a pre-determined pressure, the spool 54 is moved within bore 62 against the force of spring 66, thus unseating or cracking the nose portion from its seat. As soon as the nose portion is unseated, the secondary valve is initially opened and the pressure is reduced. This is shown in FIG. 3 wherein spool 54 has moved such that nose portion 72 is unseated from reduced portion 74 and surface 76 has moved such that port 78 is exposed to the fluid flow. FIG. 4 shows spool 54 in the full open position wherein nose 72 has moved further and surface 76 also has moved past port 78 thus allowing full and unrestricted flow in this portion of the relief cycle. The fluid then flows into the bore 62 around the nose portion and acts on surface 76 which is substantially larger than the area at the point where the nose is seated. The reduced pressure thus acts on a larger area and, depending upon the relative forces involved, holds the spool in an open position until the pressure drops sufficiently to seat the nose portion. The lower pressure retains sufficient force to hold the valve open and the fluid flows through port 78 into groove 58 and through line 46 to the reservoir until the pressure drops and the relief valve closes.

Under extreme conditions, the relief valve action or cycle may repeat several times a second such that the valve attains a hammering effect. A restrictor 80, seen in FIG. 2, is placed in line 48 such that the back pressure from the repeating cycles of relief do not trigger the valve unnecessarily. The restrictor and the decreased portion 74 of passageway 64, of course, still allow full pump flow through line 48.

It is thus seen that herein shown and described is a fluid pressure relief means in a hydraulic circuit for a power steering system which is extremely important when the vehicle operator has the steerable wheels in a full turn or cramped position. Since the hydraulic pump continues to move the fluid into the control system, the relief valve removes most of the hammering effect in this portion of the cycle. The difference in surface areas between the nose portion 72 and portion 76 is an important factor in the relief cycle during the full turn position, in that it provides the cushion for the changes in pressure. The initial unseating of the pilot part of the relief valve functions to crack at high pressures which may be in excess of 2000 pounds. The resulting lower pressures which act against surface 76 to hold the valve in a certain position during the relief cycle may drop to a value of 200 pounds during full relief conditions. Other advantages are improved belt life for accessory drives as the pump pressure is relatively lower by reason of the decreased horsepower requirements and therefore belt slippage is reduced. The lower horsepower requirement, especially during parking of the vehicle, will prevent stalling of the engine at lower r.p.m. and will enable safer parking speeds. The fluid reservoir can also be decreased in size because heat generation due to high pressure relief valve action is decreased.

It is seen that the relief device is an improvement over prior units of this type. Certain details of the valve structure are shown on the drawings to complete all the facets of hydraulic flow. For instance, spool 54 includes porting or venting in the lands to allow fluid to escape from the area. Springs 60 and 66 are of selected resiliency depending upon the desired values of relief pressure. When pressure builds up on surface 63 and on nose portion 72 which requires relief action the pilot valve is cracked open to relieve the high pressure through port 78 as shown in FIG. 3. It is entirely possible that after the initial unseating of portion 72, the decreasing pressure acts on surface 76 and moves the pilot to the full open position shown in FIG. 4. Of course, the relief cycle occurs extremely fast and the time that it takes for the high pressure output of pump 16 through line 44 to move the main relief valve land 56 past line 46 to relieve the pump pressure is a matter of milliseconds. In some cases, the unseating of portion 72 and the moving of the main relief valve may be considered to be simultaneous.

The relief structure shown and described accomplishes all the advantages and objects of the invention. While only one embodiment has been described, it is to be understood that variations can be made by one skilled in the art. For instance, the relief valve could have additional ports for simultaneous relief action to other systems and the structure and connections could be modified slightly without departing from the invention. The invention as shown and described is not intended to be taken as limited by the embodiment disclosed nor in fact in any manner except as defined by the annexed claims.

What is claimed as new and desired to be secured by Letters Patent of the United States is:

1. In a hydraulic pressure relief valve unit, a valve body having a first fluid inlet opening and a fluid outlet opening and a chamber therebetween, a first valve fluid tightly disposed in said chamber and between said openings and with one side being exposed to fluid pressure in said first fluid inlet opening for obstructing fluid flow between said openings and being movable away from said first fluid inlet opening to a position for fluid flow to said outlet opening, a second valve movably disposed in said valve body and being operative for obstructing fluid flow to said fluid outlet opening, yieldable means operative on both said valves for positioning both said valves in their fluid obstructing positions, the improvement comprising said valve body having a second fluid inlet opening located to direct inlet fluid to the side of said first valve opposite said one side, said second valve being disposed in said valve body to be exposed to fluid pressure in said second fluid inlet opening for obstructing fluid flow from said second fluid inlet opening to said fluid outlet opening, and said second valve being movable for flow of fluid therepast to relieve fluid pressure in said valve body adjacent said second fluid inlet opening and at said opposite side of said first valve for movement of said one side of said first valve to said position of fluid flow to said outlet opening.

2. The subject matter of claim 1, wherein said first valve has a fluid passageway between said second fluid inlet opening and said fluid outlet opening, said second valve being movably disposed in said fluid passageway of said first valve for obstructing fluid flow through said fluid passageway and being movable to a position of fluid flow through said passageway.

3. The subject matter of claim 2, wherein both said valves are cylindrically shaped spools axially movable relative to said fluid openings for moving in opposite directions, and said second valve has two surfaces of different sizes on planes transverse to the axis of said second valve and with only the smaller one of said surfaces exposed to fluid pressure in said second fluid inlet when said second valve is obstructing fluid flow, and with both said surfaces exposed to fluid pressure in said second fluid inlet opening when said second valve is moved relative to said first valve.

4. The subject matter of claim 1, wherein said yieldable means on both said valves is a spring disposed to force said first valve toward said first fluid inlet opening and to force said second valve toward said second fluid inlet opening, and including a fluid flow restrictor operative on said second fluid inlet opening for metering the flow of fluid through said second fluid inlet opening.

5. The subject matter of claim 1, wherein both said sides of said first valve in the areas responsive to fluid inlet pressure for moving said first valve are areas of equal size.

References Cited

UNITED STATES PATENTS

| | | | |
|---|---|---|---|
| 2,520,893 | 8/1950 | Stevenson | 137—490 |
| 2,587,161 | 2/1952 | Huber | 137—490 |
| 2,995,012 | 8/1961 | Cassady et al. | |
| 3,197,960 | 8/1965 | Forster. | |
| 3,334,705 | 8/1967 | Lam. | |

FOREIGN PATENTS

| | | |
|---|---|---|
| 66,879 | 2/1940 | Czechoslovakia. |

EDGAR W. GEOGHEGAN, *Primary Examiner.*

U.S. Cl. X.R.

60—52; 103—42; 137—110, 115, 490